United States Patent
Gerlach et al.

(10) Patent No.: US 11,301,836 B2
(45) Date of Patent: Apr. 12, 2022

(54) PORTABLE POINT-OF-SALE (POS) DEVICE

(71) Applicant: NCR Corporation, Duluth, GA (US)

(72) Inventors: Tim Gerlach, Walnut Creek, CA (US); Tomasz Kruczek, Fremont, CA (US)

(73) Assignee: NCR Corporation, Atlanta, GA (US)

( * ) Notice: Subject to any disclaimer, the term of this patent is extended or adjusted under 35 U.S.C. 154(b) by 295 days.

(21) Appl. No.: 15/782,341

(22) Filed: Oct. 12, 2017

(65) Prior Publication Data
US 2019/0114612 A1   Apr. 18, 2019

(51) Int. Cl.
G06Q 20/32   (2012.01)
G06Q 30/06   (2012.01)
G06Q 20/20   (2012.01)
G07G 1/00    (2006.01)

(52) U.S. Cl.
CPC .......... *G06Q 20/325* (2013.01); *G06Q 20/20* (2013.01); *G06Q 20/204* (2013.01); *G06Q 20/322* (2013.01); *G06Q 30/0633* (2013.01); *G07G 1/0081* (2013.01)

(58) Field of Classification Search
CPC .............................. G06Q 20/20; G07G 1/0081
See application file for complete search history.

(56) References Cited

U.S. PATENT DOCUMENTS

| | | | | |
|---|---|---|---|---|
| 2014/0001264 A1* | 1/2014 | Babu | ..................... | G06K 7/0013 235/440 |
| 2014/0249944 A1* | 9/2014 | Hicks | ................. | G06Q 30/0281 705/17 |
| 2015/0248235 A1* | 9/2015 | Offenberg | ............... | G06F 3/016 715/773 |
| 2015/0294293 A1* | 10/2015 | Signarsson | .......... | G06Q 20/327 705/17 |
| 2016/0275472 A1* | 9/2016 | Rajamannar | ........... | H04B 1/385 |

* cited by examiner

*Primary Examiner* — Peter Ludwig
*Assistant Examiner* — Avia Salman
(74) *Attorney, Agent, or Firm* — Schwegman, Lundberg & Woessner (57) ABSTRACT

A portable Point-Of-Sale (POS) device includes: at least one touchscreen interface, a dual magnetic card and chip card slot situated on one side of the POS device, at least one wireless transceiver for network connectivity to and from the POS device, and a processor configured to process POS transactions on the POS device using the at least one touchscreen interface, the dual magnetic card and chip slot, and the at least one wireless transceiver.

18 Claims, 9 Drawing Sheets

PORTABLE POINT-OF-SALE (POS) DEVICE

BACKGROUND

Generally, a POS terminal is stationary computing-core device that includes a variety of attached peripheral devices, which are typically connected through cabling to the computing core. These terminals are bulky and occupy a substantial amount of physical space. Placement of the terminals require planning and rearrangement of other fixtures within a retail establishment.

Recent developments have offloaded some functionality of POS terminals to mobile devices, such as tablets and phones. In these situations, an actual POS terminal is in the vicinity of the mobile devices. The mobile devices are more of a wirelessly connected peripheral (slave) to the POS terminals (hosts). The mobile devices are designed to be general computing devices and through customized software provide limited transaction functionality through connections to the POS.

As a result, existing mobile solutions for POS terminals are not fully functioning independent POS terminals; consequently these existing solutions have restricted POS capabilities.

SUMMARY

In various embodiments, a portable POS device and methods of operating the portable POS device are presented.

According to an embodiment, a POS device is presented. The POS device includes: at least one touchscreen interface, a dual magnetic card and chip card slot situated on one side of the POS device, at least one wireless transceiver for network connectivity to and from the POS device, and a processor configured to process POS transactions on the POS device using the at least one touchscreen interface, the dual magnetic card and chip slot, and the at least one wireless transceiver.

DETAILED DESCRIPTION

Figure 1A:
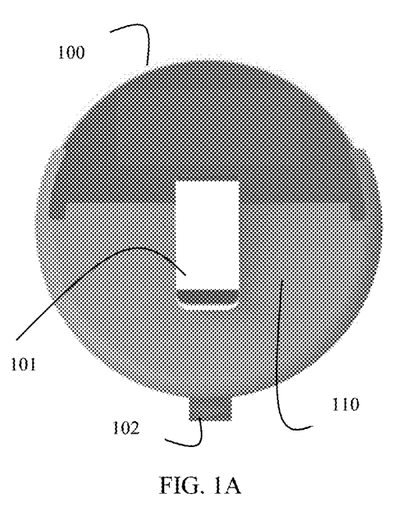
FIGS. 1A-1B are diagrams of a back view and front view of a POS device, according to an example embodiment.
Figure 1B:
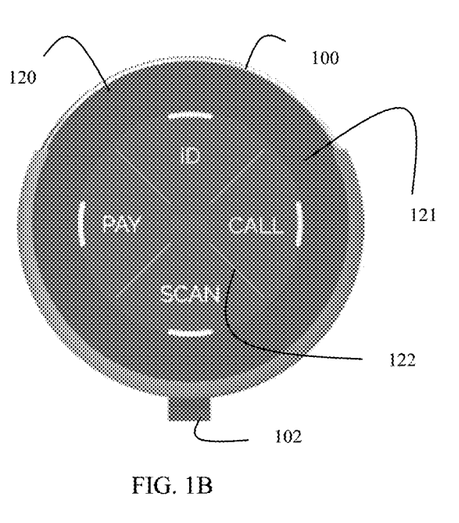

FIGS. 1A-1B are diagrams of a back view and front view of a POS device 100, according to an example embodiment, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the portable the POS device, presented herein and below.

In an embodiment, the POS device 100 is a circular and wearable transaction processing device. The diameter of the circular POS device 100 is approximately 3 inches and the thickness is approximately 1 inch. The POS device 100 includes a circular housing.

In an embodiment, POS device 100 includes a backside 110 (side opposite the interface side and also referred to as a back surface 110) having a clip 101 for clipping of affixing the POS device 100 to clothing of an individual wearing the POS device 100. The clip 101 representing a first attachment mechanism for wearing the POS device on clothing of an individual.

In an embodiment, the POS device 100 also includes an appendage 102 that extends slightly from one side of the POS device 100 and includes a hole through the appendage 102 adapted to receive a string, chain, and/or rope for wearing the POS device 100 around a neck, waist, arm, leg, and/or wrist of an individual. The appendage 102 representing a second attachment mechanism for wearing the device 100 around a neck, waist, arm, leg, and/or wrist of an individual.

In an embodiment, the POS device 100 includes just one of the clip 101 and the appendage 102.

In an embodiment, the POS device 100 includes both the clip 101 and the appendage 102.

The front side 120 (also referred to as front surface 120) of the POS device 100 includes two separate circular interface regions 121 and 122. The region 122 provides a touchscreen interface for performing POS transactions. In an embodiment, the region 122 includes an inner diameter of approximately 2.5 inches. The outer region 121 may include a reserved and separate interface region for activating administrative functions or configured for activating predefined functions for POS transactions.

The POS device 100 includes a front surface 120 a back surface 110 and a side surface 140 that separates the front surface 110 from the back surface 120.

Figure 1C:
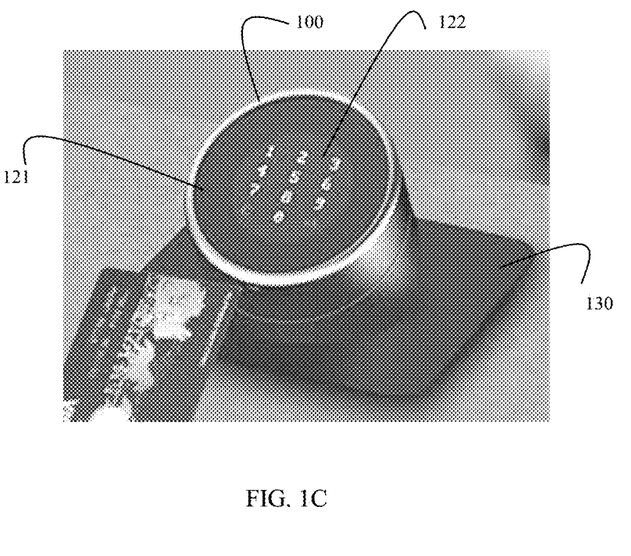
FIG. 1C is a diagram of the POS device docket in a docking attachment, according to an example embodiment.

FIG. 1C is a diagram of the POS device 100 docketed in a docking attachment 130, according to an example embodiment. The POS device 100 includes a port, such as USB port 150 (shown in the FIG. 1I) that attaches the POS device 100 into the docking station 130. This permits the POS device 100 to charge for a battery and receive Direct Current (DC) power 170 and permits the POS device 100 to operate peripheral devices networked to the docket station 130 (such as a cash drawer, printer, handheld scanner, etc.).

Figure 1D:
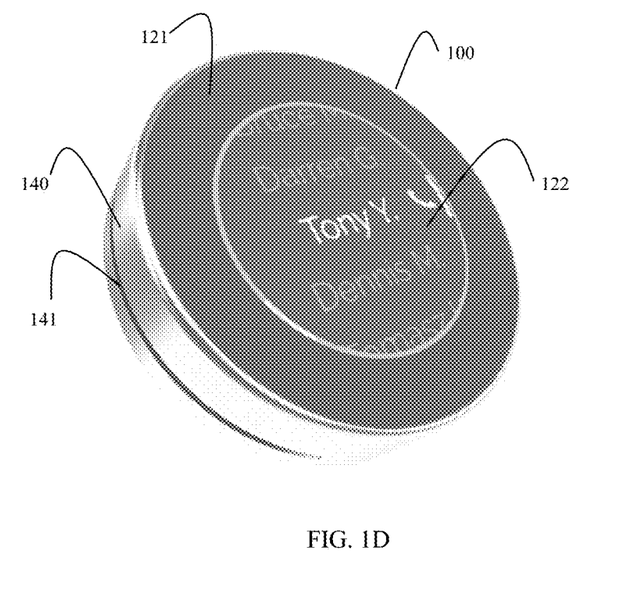
FIG. 1D is a diagram of a front and side view of the POS device, according to an example embodiment.

FIG. 1D is a diagram of a front and side view of the POS device 100, according to an example embodiment. A recessed area 141 extends around a side of the POS device 100 providing access to internal components for reading a magnetic strip and/or chip on a payment card. The recessed area 141 is along the outer circumference for one side of the device 100.

The recessed area 141 is also referred to herein as a dual magnetic card and chip card slot 141 for which magnetic cards and chip cards can be read through swiping through or inserting into the same slot 141.

In an embodiment, the slot 141 is a semi-circle that is situated on the side surface 140.

The FIG. 1D also illustrates that the device 100 can be used to make voice calls through a microphone 153, touchscreens 158, wireless transceivers 151, and a speaker 154 of the device (shown in the FIG. 1I below). The touchscreens 158 may also be used for Short Message Service (SMS) text messaging. A front and/or rear facing camera 190 can also support video-based calls.

Figure 1E:
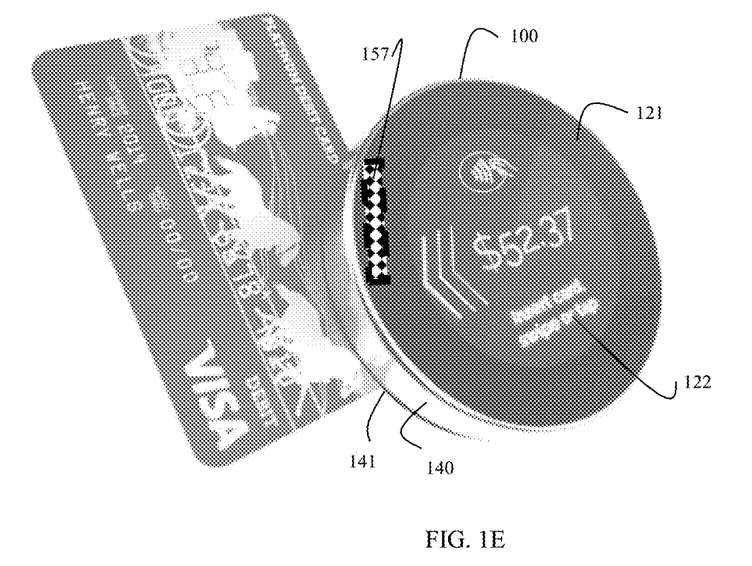
FIG. 1E is a diagram of a payment card being swiped through a side card reader of the POS device, according to an example embodiment.

FIG. 1E is a diagram of a payment card being swiped through a side card reader of the POS device 100, according to an example embodiment. Internal to an external surface of the device 100 is a magnetic card reader 157, such that the device 100 can read a payment card for transaction processing when the payment card is inserted into the recess 141 and the card is swiped up or down through the recess area 141 permitting the card reader 157 to read the magnetic strip of the payment card.

Figure 1F:
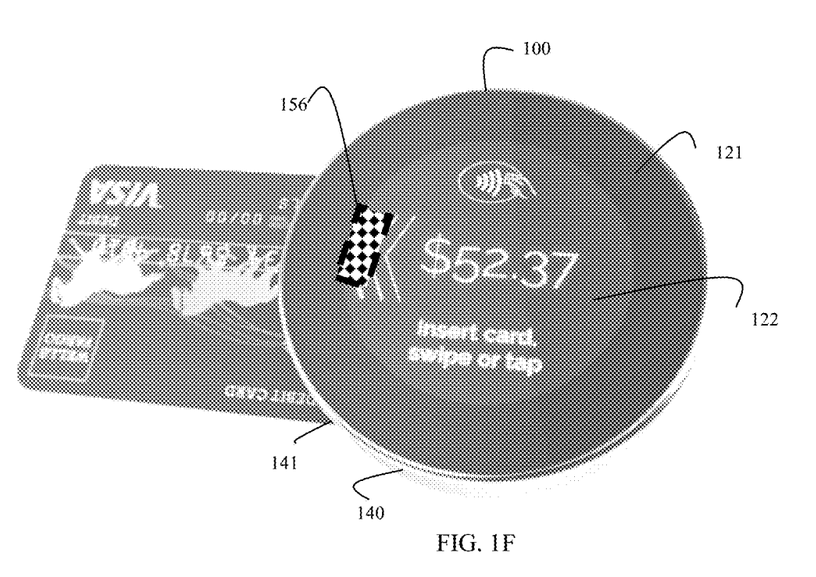
FIG. 1F is a diagram of payment card chip being inserted into a side of the POS device for reading the card chip, according to an example embodiment.

FIG. 1F is a diagram of payment card chip being inserted into a side of the POS device 100 for reading the card chip, according to an example embodiment. The recessed area 141 includes a deeper recessed area along a center of the recessed area 141 relative to a center point of the front of the device 100. This permits a payment card with a chip to be inserted into the same recessed area 141 at a deeper depth from that which was used when swiping a magnetic card through the slot 141 and used for reading a card chip by an internal chip reader 156. That is, the same recessed area 141 reads magnetic strips through internal component 157 and reads chips through internal component 156. This is done through a portion of the recessed area 141 have a deeper recess into the internal portion of the device where the chip reader 156 is situated.

Figure 1G:
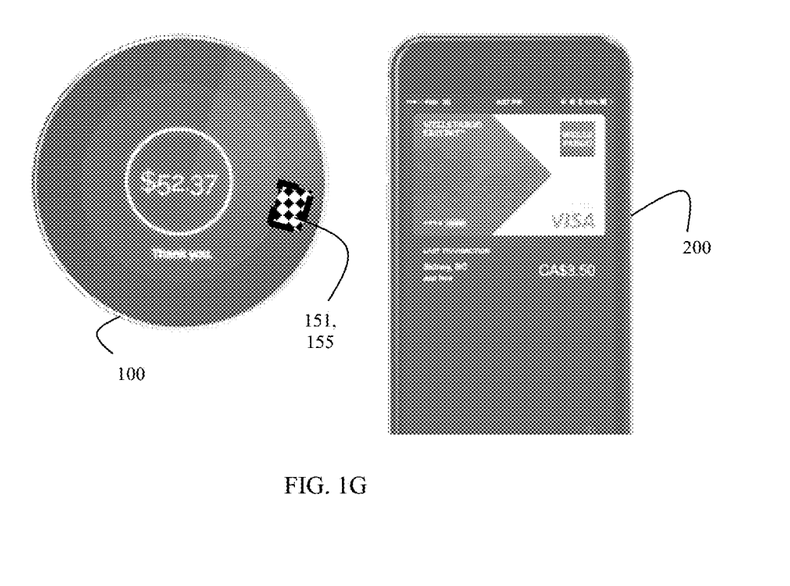
FIG. 1G is a diagram of the POS device processing wireless payment received from a phone, according to an example embodiment.

FIG. 1G is a diagram of the POS device 100 processing wireless payment received from a phone 200, according to an example embodiment. Near Field Communication (NFC) between the device 100 and the phone 200 can be achieved through an internal NFC module 155. Additionally, Bluetooth®, Wi-Fi, cellular, and other wireless technologies can be achieved through wireless transceivers 151.

Figure 1H:
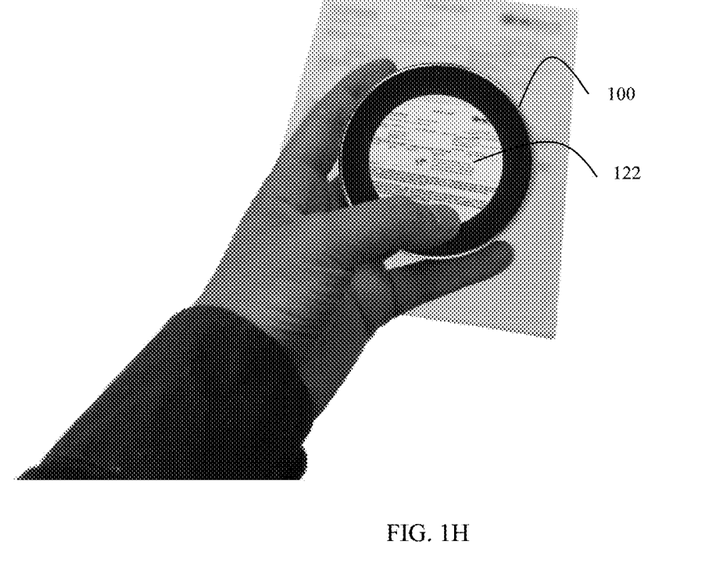
FIG. 1H is a diagram of the POS device using a rear-facing camera to scan a document, according to an example embodiment.

FIG. 1H is a diagram of the POS device 100 using a rear-facing camera 190 to scan a document, according to an example embodiment.

A rear-facing camera 190 can be used to present in area 122 a field of view of the rear-facing camera 190. This permits text of a document to be scanned as an image and allows Optical Character Recognition (OCR) software processing on the device 100 or processing on a networked device to the device 100 to OCR the document image for other POS transaction-related processing during a transaction with the device 100.

Figure 1I:
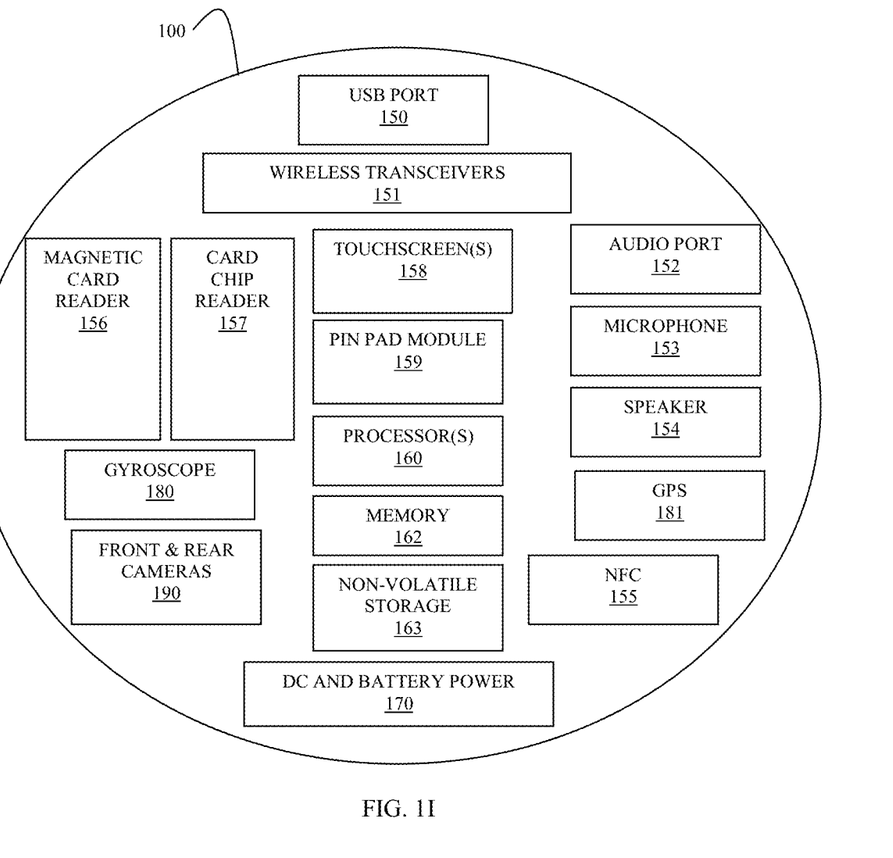
FIG. 1I is a block diagram of components of the POS device, according to an example embodiment.

FIG. 1I is a block diagram of components of the POS device 100, according to an example embodiment. It is noted that other components from that which is illustrated in the FIG. 1I may be provided without departing from the embodiments of the device 100 taught herein.

The device 100 includes at least Universal Serial Bus (USB) port 150. This port 150 provided wired connectivity between the device 100 and other devices, such as peripherals. The port 150 can also be used for receiving Direct Current (DC) power and for charging the battery (DC and Battery Power 170).

The device 100 also includes one or more wireless transceivers 151 for receiving and sending wireless communications through Peer-to-Peer (P2P) connectivity with a second device. In an embodiment, the transceivers 151 include a Bluetooth® transceiver and a Wi-Fi transceiver. A wireless transceiver 151 may also be used for establishing a local area network connection with a local area network (LAN).

In an embodiment, the device 100 may include an audio port 152 for attaching a headphone or additional speaker to the device.

The device 100 includes a microphone 153 for receiving, communicating (over a wireless connection through the transceivers 151), and processing spoken audio received through the microphone 153.

The device 100 also includes a speaker 154 for playing audio from the device 100.

The device 100 also includes a NFC transceiver 155 for processing NFC data in a P2P connection with a second device.

As discussed above, the device 100 includes a magnetic card reader 156 and a chip card reader 157 both of which are situated in the same recessed slot 141 for processing payment card or loyalty card information from a transacting customer.

The device 100 includes a touchscreen 158. The touchscreen 158 can have two separate and independent processing regions 121 and 122 as discussed above.

The device 100 may also include a Personal Identification Number (PIN) pad module 159 for processing encrypted PIN information received from a customer.

The device 100 includes one or more hardware processors 160, non-volatile and volatile memory 162, and non-volatile storage 163 for processing input from the modules, connecting in P2P communications with second devices, displaying visual information on the touchscreen 158, and executing software modules including a POS transaction manager for processing customer transactions.

The processor 160 is configured to process POS transactions on the device 100. Touch inputs may be received through the touchscreens 158 and wireless inputs received from the wireless transceivers 151 (and/or the USB port 150).

The device 100 may, in an embodiment, also include a gyroscope 180 for determining a held orientation of the device 100 by an operator of the device 100 and properly orienting the display screens on the touchscreen 158 (display).

In an embodiment, the device 100, includes a Global Positioning Satellite (GPS) receiver for processing and reporting a physical location of the device 100.

The device 100 includes at least one camera 190. The camera 190 captures images that are external to the device 100. In an embodiment, the images are barcodes and/or Quick Response (QR) codes and the device 100 includes software modules processing on the processor 160 for reading the codes for POS transaction processing.

In an embodiment, the device 100 includes two cameras 190 (a front-facing camera 190 (facing side 120) and a rear-facing camera 190 (facing side 110)). In an embodiment, at least one of two cameras 190 provides document scanning and the processor 160 is configured to perform OCR on a scanned image of a document (as shown in the FIG. 1H). It is noted that the document image may also be sent through a network connection of the device 100 to a second networked device where the OCR processing can be performed on the document image.

In an embodiment, the images are facial or palm features of a user and the device 100 includes software modules processing on the processor 160 for performing biometric authentication on the user's face and/or palm authentication.

The camera 190 may also provide video for capturing video external to the device 100 and providing the video over the wireless transceivers to a connected device for video assistance and/or remote user verification.

The device 100 is configured with a transaction manager (software modules) for processing by the processor 160 customer transactions on the device 100. Wireless communications can be achieved to network-based servers for purposes of achieving payment for the transactions. Additionally, direct P2P communications with customer devices can be achieved for interacting with the customer during the transaction.

The device 100 can connect through the wireless transceivers 151 to other networked peripherals, such as a receipt or coupon printer. The device 100 can be docked through docking station 130 where a larger display can be used as a second display (second to the integrated touchscreen display 158) and where a cash drawer and/or safe can be accessed.

The device 100 is larger than a conventional watch and smaller than a conventional tablet. The device 100 provides a novel configuration and dual magnetic and chip card reader through a single slot 141. Moreover, the shape and size of the device 100 coupled with the clip 101 and/or appendage 102 permits the device 100 to worn in a practical and unobtrusive manner by an operator (user, clerk, teller, cashier etc.) while maintaining sufficient computing power, network connectivity, and integrated peripheral capability through a touchscreen display 158 interface that is large enough in size to communicate and receive sufficient information for performing POS transactions.

The device 100 is a single completely functioning POS host device 100, representing the computing-core for transaction processing. Conventionally, this is not the case where mobile devices are slaves to the host POS core.

Figure 2:
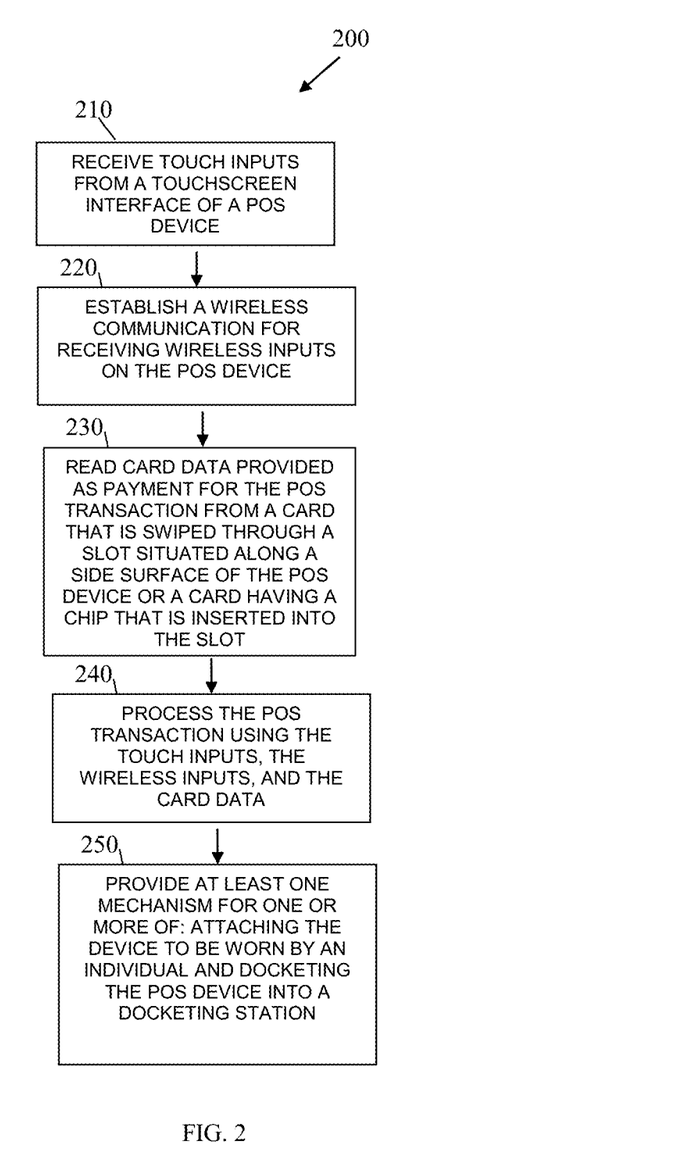
FIG. 2 is a diagram of a method of operating the POS device, according to an example embodiment.

FIG. 2 is a diagram of a method 200 for operating the POS device 100, according to an example embodiment. The software module(s) that implements the method 200 is referred to as a "POS transaction manager." The POS transaction manager is implemented as executable instructions programmed and residing within memory 162 and/or a non-transitory computer-readable (processor-readable) storage medium 163 and executed by one or more processors 160 of the POS device 100. The processor(s) 160 of the POS device 100 that executes the POS transaction manager are specifically configured and programmed to process the POS transaction manager. The HD authenticator may have access to one or more network connections during its processing. The network connections can be wired 150, wireless 151 and/or 155, or a combination of wired and wireless.

At 210, the POS transaction manager receives touch inputs from the touchscreen interface 158 of the device 100.

At 220, the POS transaction manager establishes a wireless communication for receiving wireless inputs on the POS device 100.

At 230, the POS transaction manager reads card data provided as payment for a POS transaction when card is swiped through the slot 141 along a side surface of the POS device 100 or when the card is inserted into the same slot 141.

At 240, the POS transaction manager processes the POS transaction using the touch inputs, the wireless inputs, and the card data.

In an embodiment, at 250, the POS transaction manager provides one or more mechanisms for: attaching the device 100 to be worn by an individual and docketing the device 100 into a docketing station 130.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A Point-Of-Sale (POS) device, comprising:
at least one touchscreen interface comprising a first circular region and a second circular region, wherein the second circular region is situated along a touchscreen outer perimeter of the at least one touchscreen interface and surrounding an outer perimeter of the first circular region, wherein the first circular region configured to provide a first touch interface associated with processing POS transactions on the POS device, wherein the second circular region configured to provide a second touch interface associated with activating administrative functions of the POS device, wherein the first circular region comprises a diameter of approximately 2.5 inches with the second circular region located between the outer perimeter of the first circular region and the touchscreen outer perimeter, wherein POS touch options of the first touch interface are accessed within the diameter of the first circular region and administrative options associated with the administrative functions of the second touch interface are accessed between the outer perimeter of the first touch interface and the touchscreen outer perimeter;
a single dual magnetic card and chip card slot situated on one side of the POS device, wherein the single dual magnetic card and chip card slot comprising a recessed area on the one side of the device to read magnetic cards swiped through the dual magnetic card and chip card slot and a center of the recessed area comprises a deeper recessed area to receive and to read chip cards inserted into the center of the recessed area, wherein the single dual magnetic card and chip card slot is a semi-circle shape situated on the one side of the device, wherein the single dual magnetic card and chip card slot comprises a magnetic card reader situated within a first portion of the recessed area and comprises a chip card reader situated within a second portion of the deeper recessed area of the recessed area;

at least one wireless transceiver for network connectivity to and from the POS device; and a processor configured to process POS transactions on the POS device using the at least one touchscreen interface, the dual magnetic card and chip slot, and the at least one wireless transceiver.

2. The POS device of claim 1 further comprising, a camera, wherein the processor is further configured to process barcodes and Quick Response (QR) codes from images captured by the camera.

3. The POS device of claim 1 further comprising, at least one attachment mechanism for an individual to wear the POS device.

4. The POS device of claim 3, wherein the at least one attachment mechanism is a clip affixed to a back surface of the POS device to clip to clothing of the individual.

5. The POS device of claim 4, wherein the at least one attachment mechanism further includes an appendage that extends from a bottom of the POS device and includes a hole for passing a string or a chain through to wear the POS device around a neck or a waist of the individual.

6. The POS device of claim 1 further comprising, a Near Filed Communication (NFC) transceiver.

7. The POS device of claim 1 further comprising, one or more of: an audio port, a microphone, and a speaker.

8. The POS device of claim 1 further comprising, a Global Positioning Satellite (GPS) receiver.

9. The POS device of claim 1 further comprising, a gyroscope.

10. The POS device of claim 1, wherein an outer shell of the POS device is a circle with a diameter of approximately three inches and a width of approximately an inch.

11. A Point-Of-Sale (POS) device, comprising:

a circular housing have a front surface, a back surface, and side surface that separate the front surface and the back surface;

a semi-circle recessed area along a portion of the side surface;

a magnetic card reader encased within the circular housing within a first portion of the semi-circle recessed area of the side surface and adapted to read a magnetic card that is passed through the first portion of the semi-circle recessed area;

a chip card reader encased within the circular housing within a second portion of the semi-circle recessed area of the side surface to read a chip card that is inserted in a center of the semi-circle recessed area that was associated with the magnetic card reader, wherein the center of the semi-circle recessed area comprises a deeper recessed area inside the POS device than are other portions of the recessed area having the magnetic card reader and the deeper recessed area comprising the chip card reader, wherein the second portion of the semi-circle recessed area is the deeper recessed area;

a touch screen comprising a first circular region and a second circular region, wherein the second circular region is situated along a touch screen outer perimeter of the touch screen and surrounding an outer perimeter of the first circular region, wherein the first circular region configured to provide a first touch interface associated with processing POS transactions on the POS device, wherein the second circular region configured to provide a second touch interface associated with activating administrative functions of the POS device, wherein the first circular region comprises a diameter of approximately 2.5 inches with the second circular region located between the outer perimeter of the first circular region and the touchscreen outer perimeter, wherein POS touch options of the first touch interface are accessed within the diameter of the first circular region and administrative options associated with the administrative functions of the second touch interface are accessed between the outer perimeter of the first touch interface and the touchscreen outer perimeter; and a processor configured to process the POS transactions from input received from the touch screen via the first touch interface and process card information for payment of the POS transactions received from the magnetic card reader and the chip card reader, and wherein the processor configured to process the administrative functions of the POS device when the administrative functions are activated by second input received from the touch screen via the second touch interface.

12. The POS device of claim 11 further comprising, a first attachment mechanism centered on the back surface and a second attachment mechanism extending off a portion of the side surface, wherein the first and second attachment mechanisms are adapted to permit the POS device to be worn on clothing of an individual or a neck of the individual.

13. The POS device of claim 11 further comprising, a wireless transceiver, wherein the processor is further configured to interact with the wireless transceiver for network connectivity of the POS device to a second device during the POS transactions.

14. The POS device of claim 11 further comprising, a camera, wherein the processor is further configured to process barcode or Quick Response (QR) codes from images captured by the camera during the POS transactions.

15. The POS device of claim 11 further comprising a Universal Serial Bus (USB) port configured to: supply Direct Current (DC) power to the POS device, charge a battery of the POS device, and establish communication with at least one second device.

16. The POS device of claim 11 further comprising one or more of: a Near Field Communication (NFC) transceiver, a speaker, a microphone, an audio port, a gyroscope, and a Global Positioning Satellite (GPS) receiver.

17. A method of conducting a Point-Of-Sale (POS) transaction on a portable POS device, comprising:

receiving first touch inputs from a first touchscreen interface of the POS device, wherein the first touchscreen interface provided through a first circular region adapted to detect and receive the first touch inputs for the portable POS device;

establishing a wireless communication for receiving wireless inputs on the POS device;

reading card data provided as payment for the POS transaction when a card is swiped through a single slot situated along a side surface of the POS device within a first portion of a recessed area and when the card is inserted into a center of the single slot representing a second portion of the recessed area to read a chip of the card, wherein reading the card data further includes providing the single slot as the recessed area that comprises a magnetic card reader within the first portion of the recessed area along the side surface and that comprises a card chip reader within the second portion of the recessed area along the side surface, wherein the second portion of the recessed area is situated in the center of the recessed area is a deeper recessed area from the first portion of the recessed area, wherein the deeper recessed area is adapted for inserting the chip cards into the center of the recessed area;

processing the POS transaction using the touch inputs, the wireless inputs, and the card data;

receiving second touch inputs from a second touchscreen interface of the portable POS device, wherein the second touchscreen interface provided through a second circular region situated along an outer perimeter of the first touchscreen interface and surrounding the first circular region; and activating and processing at least one administrative function on the POS device based on one or more of the second touch inputs wherein the first circular region comprises a diameter of approximately 2.5 inches with the second circular region located between the outer perimeter of the first touchscreen interface and a touchscreen outer perimeter of the second touchscreen interface, wherein the first touch inputs of the first touchscreen interface are accessed within the diameter of the first circular region and the second touch inputs of the second touchscreen interface are accessed between the outer perimeter of the first touchscreen interface and the touchscreen outer perimeter.

18. The method of claim 17 further comprising, providing mechanism for: attaching the device to be worn by an individual and docketing the POS device into a docketing station.

\* \* \* \* \*